(12) United States Patent
Nye et al.

(10) Patent No.: US 9,459,112 B2
(45) Date of Patent: Oct. 4, 2016

(54) SECURITY SYSTEM WITH TRAFFIC MONITORING

(71) Applicant: Vivint, Inc., Provo, UT (US)

(72) Inventors: James E. Nye, Alpine, UT (US); Jeremy B. Warren, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 14/209,741

(22) Filed: Mar. 13, 2014

(65) Prior Publication Data

US 2014/0278028 A1 Sep. 18, 2014

Related U.S. Application Data

(60) Provisional application No. 61/793,818, filed on Mar. 15, 2013.

(51) Int. Cl.
*G01C 21/34* (2006.01)
*G08G 1/0968* (2006.01)
*G08G 1/0969* (2006.01)
(Continued)

(52) U.S. Cl.
CPC ....... *G01C 21/3492* (2013.01); *G01C 21/3694* (2013.01); *G08G 1/0969* (2013.01); *G08G 1/096844* (2013.01); *G08B 29/00* (2013.01)

(58) Field of Classification Search
CPC .. G08G 1/017; G08G 9/00; G08G 1/096872; G08G 1/096833; G08G 1/07; G08G 1/096844; G08G 1/0969; G01C 21/3423; G01C 21/3492; G01C 21/34; G01C 21/3694; G08B 27/00; G08B 19/00; G08B 1/08; G08B 25/008; G08B 21/22; G08B 29/00; H04L 12/2827; H04L 12/28; H04L 12/2825; H04L 12/66; G06F 3/043; G06F 3/041; G06F 3/0484; H04M 11/00; H04M 1/66; G01D 13/00; H04N 7/18; H04N 7/181; G05B 19/042; B60K 35/00; B60K 37/06; G09G 5/08; H04W 36/00; H04W 12/08; G07C 9/00

See application file for complete search history.

(56) References Cited

U.S. PATENT DOCUMENTS 6,930,596 B2    8/2005    Kulesz et al.
7,397,363 B2    7/2008    Joao
7,398,076 B2 *   7/2008    Kubota ............ G08G 1/096725
                                                              455/344

(Continued)

FOREIGN PATENT DOCUMENTS

WO      2008/027836      3/2008

OTHER PUBLICATIONS

Cox Home Security, "User Guide", Cox Communications, Inc., pp. 1-30, 2012.

(Continued)

*Primary Examiner* — Behrang Badii
(74) *Attorney, Agent, or Firm* — Holland & Hart, LLP

(57) ABSTRACT

The present disclosure relates to approaches for providing real time traffic information to a user using a control panel of a building automation system. The control panel includes a processor, a memory in electronic communication with the processor, and instructions stored in the memory that are executable by the processor to couple the control panel to at least one of a sensor and a controller of the building automation system, receive traffic data for a geographic area associated with the control panel, and generate at least one audible notification to communicate the traffic data to a user through the control panel.

17 Claims, 11 Drawing Sheets

(51) Int. Cl.
*G01C 21/36* (2006.01)
*G08B 29/00* (2006.01)

(56) References Cited

U.S. PATENT DOCUMENTS

| | | | | |
|---|---|---|---|---|
| 2003/0041107 | A1* | 2/2003 | Blattner | G06Q 10/10 709/204 |
| 2009/0204320 | A1* | 8/2009 | Shaffer | G01C 21/3415 701/533 |
| 2009/0267921 | A1* | 10/2009 | Pryor | B60K 35/00 345/177 |
| 2010/0127854 | A1* | 5/2010 | Helvick | G08B 25/008 340/539.14 |
| 2011/0039518 | A1* | 2/2011 | Maria | H04L 12/66 455/406 |
| 2011/0080303 | A1* | 4/2011 | Goldberg | G08G 1/07 340/909 |
| 2011/0251790 | A1* | 10/2011 | Liotopoulos | G08G 1/0969 701/533 |
| 2014/0266669 | A1* | 9/2014 | Fadell | G05B 19/042 340/501 |
| 2015/0280937 | A1* | 10/2015 | Sadhu | H04L 12/2827 709/217 |

OTHER PUBLICATIONS

Xfinity Home Security, "User Manual", iControl Networks, Inc., pp. 1-33, 2010.

* cited by examiner

SECURITY SYSTEM WITH TRAFFIC MONITORING

CROSS-REFERENCE TO RELATED APPLICATIONS

This application claims the benefit of the filing date of U.S. Provisional Application No. 61/793,818, filed Mar. 15, 2013, and entitled SECURITY SYSTEM WITH TRAFFIC MONITORING, which is assigned to the assignee hereof.

TECHNICAL FIELD

This disclosure relates generally to building automation and security systems and, more specifically, to building automation and security systems with traffic monitoring.

BACKGROUND

Security systems are widely used to protect property and provide personal safety. Security systems generally include a control unit that controls the overall operation of the system, one or more keypads providing user access to the system, and various detectors and sensors.

Security systems may generate an alarm in response to any number of events, such as unauthorized entry, fire, medical emergency or manual alarm activation. The security system may be associated with a service that remotely monitors the status of the security system. Thus, if the security system generates an alarm, a notification signal may be transmitted via a wired and/or wireless communications link to a monitoring system. Upon receiving the notification, security service personnel for the monitoring system may attempt to contact the property owner or other party at the facility to verify the alarm. If it is appropriate to do so, a security service representative may, upon confirmation of the alarm, contact an emergency response agency such as the police department, the fire department, an emergency medical team, or other appropriate entity.

As security systems take on larger roles in the lives of the persons owning them, the security system and its components have an opportunity to take on new roles. For example, the security system may also provide some building automation functions. As disclosed herein, one possible new role is providing additional information about traffic conditions for the users of the security system.

SUMMARY

Methods and systems are described for communicating traffic data to a user of a building automation system. According to at least one embodiment, a control panel for a building automation system includes a processor, a memory in electronic communication with the processor, and instructions stored in the memory that are executable by the processor to couple the control panel to at least one of a sensor and a controller of the building automation system, receive traffic data for a geographic area associated with the control panel, and generate at least one audible notification to communicate the traffic data to a user through the control panel.

In one example, the instructions may be executable by the processor to display a map comprising at least a portion of the geographic area on a display of the control panel, and overlay a visual representation of the traffic data onto the map. The at least one audible notification may include at least one of directions to a specified destination and estimated travel time to a specified destination. The at least one audible notification may relate to traffic conditions on one or more predetermined routes. The instructions may be executable by the processor to automatically communicate the traffic data to the user through the control panel during at least one predefined time period. A first predefined time period may correspond to a morning commute time period and a second predefined time period may correspond to an evening commute time period.

In another example, the instructions may be executable by the processor to communicate the traffic data to the user through at least one device communicatively coupled to the control panel. The at least one device may include at least one of a television, a clock, a radio, and a mobile electronic device. The instructions may be executable by the processor to communicate a suggested route to a destination based on the traffic data. Communicating the suggested route may include sending the suggested route to a mobile electronic device in response to detecting a departure of the user associated with the suggested route. The traffic data may include traffic incidents, and the instructions may be executable by the processor to communicate the traffic incidents to the user. The traffic data may be received from a remote server. The geographic area may be one of a neighborhood, a city, a county, and a user-defined geographic area.

Another embodiment relates to a computer-program product for communicating traffic data. The computer-program product includes a non-transitory computer-readable medium storing instructions executable by a processor to receive traffic data of interest to a user of a control unit for a home automation system, and automatically communicate the traffic data to the user through the control panel during at least one predefined time period.

In one example, a first predefined time period may correspond to a morning commute time period and a second predefined time period may correspond to an evening commute time period. The instructions may be executable by a processor to display a map of a geographic area on a display unit of the control unit, and overlay a graphical representation of at least a portion of the traffic data over the map of the geographic area displayed on the display unit. The instructions may be executable by a processor to determine at least one suggested route to a destination, and estimate an amount of time for traveling the at least one suggested route. The instructions may be executable by a processor to receive an actual time for traveling a suggested route to a destination from a mobile electronic device of a user traveling the suggested route, and associate the actual time with the traffic data for determining future suggested routes.

A further embodiment relates to a computer-implemented method for communicating traffic data to a user. The method includes receiving traffic data for a geographic area associated with a control unit for a home automation system, receiving a destination from a user of the home automation system, displaying traffic conditions along at least one route from a location of the control unit to the destination on a display of the control unit, and estimating a travel time for each of the at least one routes and communicating information about the at least one route having a shortest travel time as a suggested route for the user. The method may also include automatically sending the suggested route to a mobile electronic device of the user.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
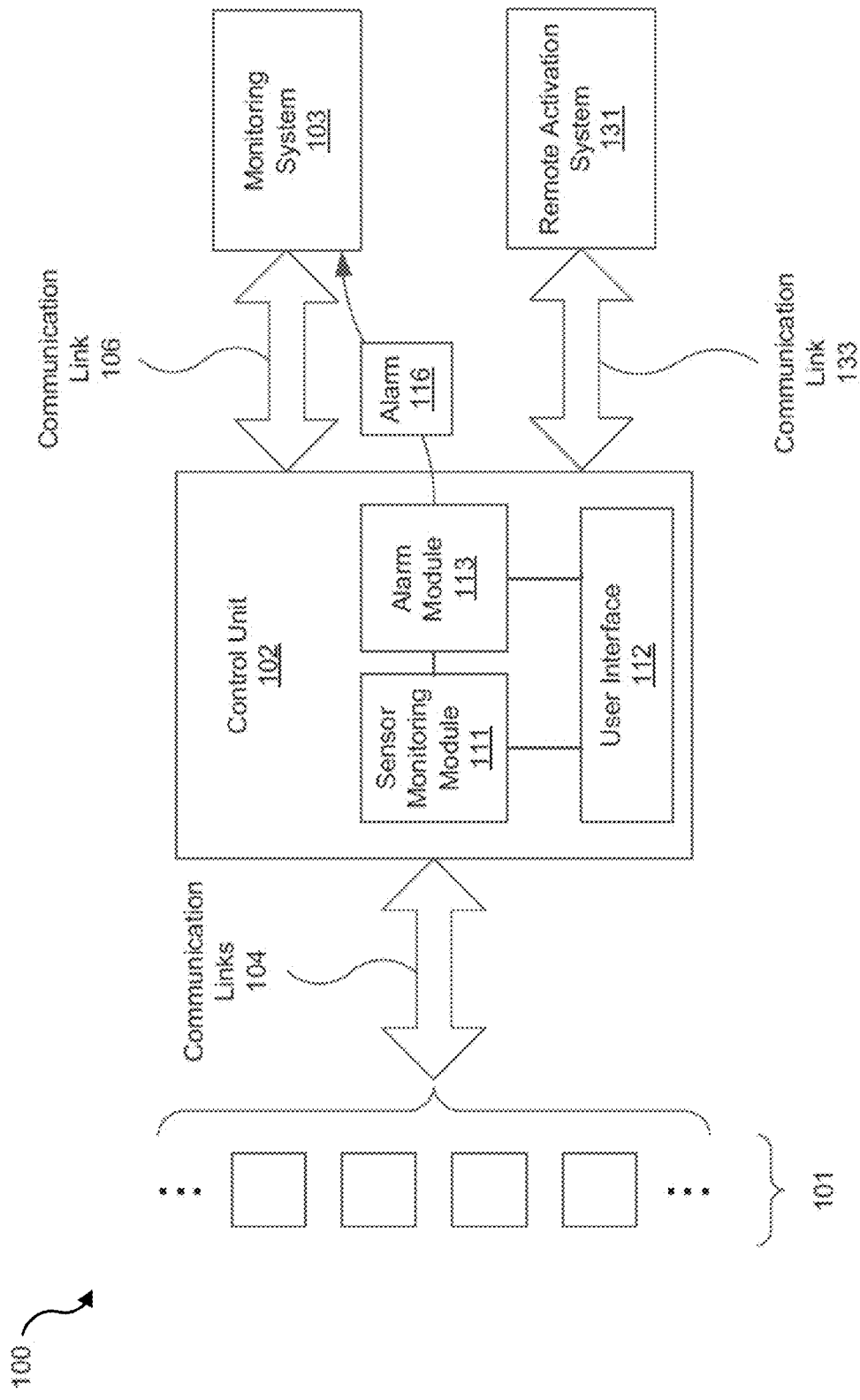
FIG. 1 illustrates an embodiment of a security system.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Referring in general to the accompanying drawings, various embodiments of the present invention are illustrated to show the structure and methods for installing a component within a system, such as a security system and/or an automation system. The systems disclosed herein may be generically referred to as automation systems, which may or may not include security features, automation features, and related functionality. The terms "automation" and "security" as they relate to the feature and functionality of the disclosed systems may be used interchangeably. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the invention.

The following provides a more detailed description of ways to implement the present invention and various representative embodiments thereof. In this description, functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present invention may be practiced by numerous other solutions. For the most part, details concerning timing considerations and the like have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

FIG. 1 illustrates an embodiment of an automation system 100, which may also be referred to as an "alarm system," a "security system," or an "automation and security system." The automation system 100 includes sensors 101 (also referred to as security sensors), a control unit 102, monitoring system 103, and remote activation system 131. Communication links 104 (which may be a combination of wired and wireless communication links) couple sensors 101 to control unit 102. Wired communication links may include circuit loops that are either detected as closed or open. In some embodiments, sensors 101 and control unit 102 are located in the same facility, such as in the same residence or in the same building. Communication link 106 (which may be a wired telephone connection, wired or wireless network connection, cellular connection, etc., or combination thereof) may couple the control unit 102 to monitoring system 103. In other embodiments, the system shown in FIG. 1 may be implemented without a monitoring system 103. In certain embodiments, the monitoring system 103 may communicate with multiple control units 102 belonging to other security systems.

Sensors 101 monitor for certain events and report relevant events to the control unit 102. Sensors 101 may include any of a variety of different types of sensors, such as door and window sensors, motion sensors, glass break sensors (e.g., sensors that detect a physical break or detecting the sound of a glass break), etc. The control unit 102 may be configured to monitor sensors 101 for alarm conditions via communication links 104 and to relay alarms to the monitoring system 103 via communication link 106. The sensors 101 may, in response to detecting an alarm condition, send an alarm condition message to the control unit 102.

Control unit 102 may include sensor monitoring module 111, user interface 112, and alarm module 113. Sensor monitoring module 111 is configured to monitor sensors 101. Sensors 101 may sense and/or indicate a change in their physical surroundings (e.g., a normally closed connection becomes open, a signal indicating that the sound of breaking glass was detected, etc.) which may be indicative of an unauthorized access, fire, or other event. The sensors 101 may communicate messages on communication links 104. For example, a circuit connected to a door sensor 101 may transition from closed to open (or to a resistance exceeding a pre-determined resistance threshold) indicating that a door has been opened. A motion sensor 101 may send an electrical signal indicative of detected motion. Sensor monitoring module 111 may monitor communication links 104 for alarm condition messages sent from sensors 101. Upon sensor monitoring module 111 receiving an alarm condition message signaling occurrence of an alarm condition, sensor monitoring module 111 may send a signal to alarm module 113.

The alarm module 113 may validate the alarm condition has occurred before communicating with the monitoring system 103 or generating an alarm using the alarm 116. For example, the alarm module 113 may validate an alarm condition indicating that a window is open when the security system is on, but may not validate the same alarm condition when the security system is off.

The alarm module 113 may cause an alarm 116 to generate an alarm signal in response to validating the alarm condition. The alarm 116 may provide an audio signal (such as beeping, audio instructions, or other suitable audio), a visual signal (such as a flashing light), an electronic signal (such as a notification) or some combination thereof to alert a user to the alarm condition. Where the control unit 102 is associated with one or more controllers providing building automation features, the control unit 102 may also use those features to provide an alarm. For example, the control unit 102 may flash one or more interior lights as part of the alarm.

User interface 112 may include an input interface and an output interface. The input interface may comprise a physical input interface or virtual input interface that may include a numeric key pad (e.g., for entering a disarm code, etc.), sensor activation buttons, physical duress buttons, or other input/output devices. The input interface may include a condenser for receiving audio input and/or communicating with monitoring system 103. The output interface may include an output display device that displays system status, such as armed and disarmed, sensors/zones that have detected change in physical surroundings, and other relevant information. The output interface may also include a speaker that audibly outputs information similar to that displayed on the output display device. The speaker may also be used by monitoring system 103 to communicate with a user of control unit 102. Other input/output approaches may also be implemented as part of the user interface 112.

The control unit 102 may also communicate over a communication link 133 with a remote activation system 131. The remote activation system 131 may allow a user to interact with the control unit 102 remotely. For example, the user may be able to arm and disarm the automation system 100 from a mobile device such as a cellular phone using the remote activation system 131. In one embodiment, the remote activation system 131 includes software installed on the mobile device of the user.

Figure 2:
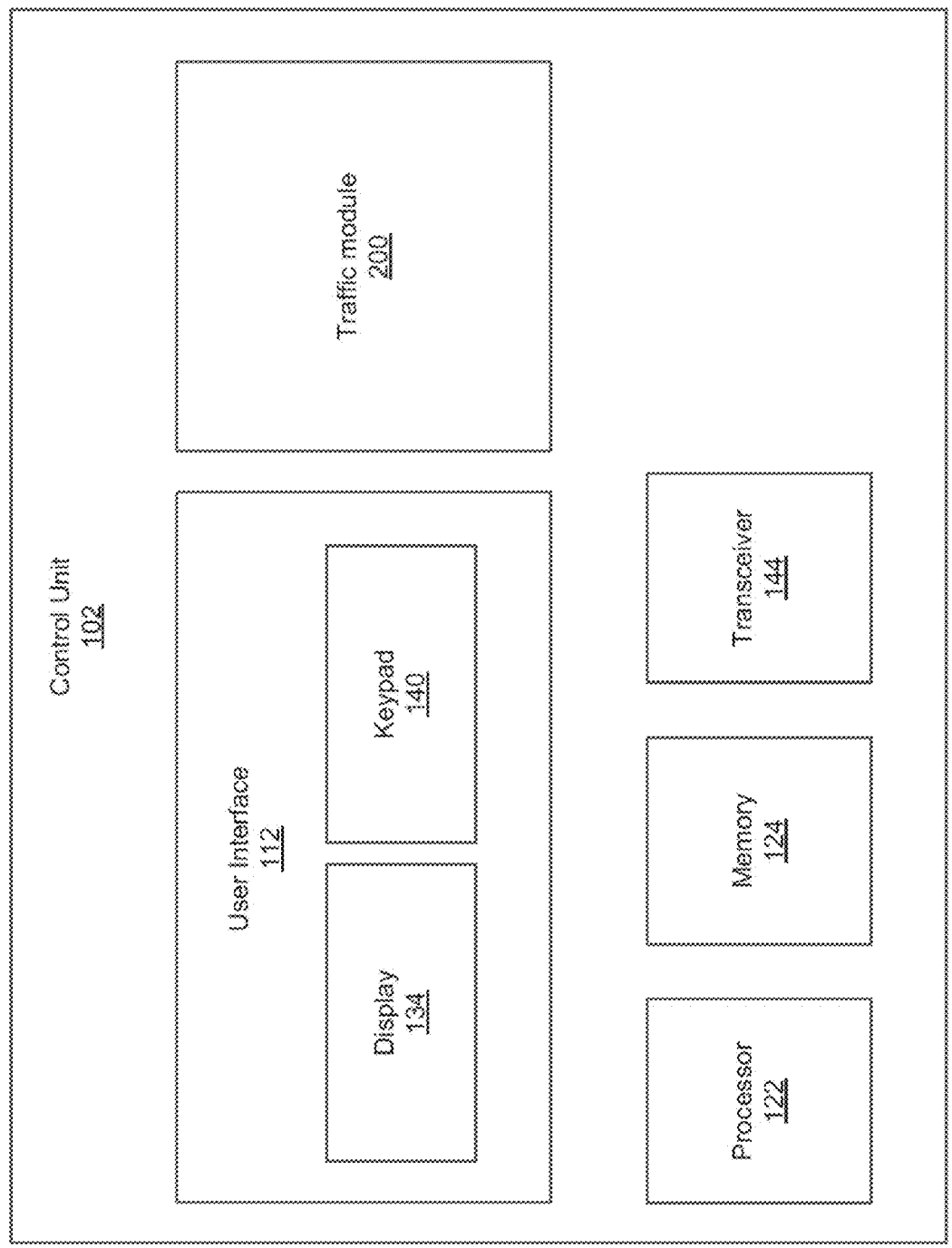
FIG. 2 is a block diagram of an embodiment of a control unit of a security system that includes a traffic module.

FIG. 2 is a block diagram of one embodiment of a control unit 102. Control unit 102 may include a processor 122, memory 124, transceiver 144, and user interface 112. User interface 112 may include various input/output (I/O) devices, such as a display 134, which may comprise a touch screen, and keypad 140. Control unit 102 may further include a transceiver 144 for receiving and transmitting data over a network. It is noted that a "communication interface" as referred to herein may comprise transceiver 144 and user interface 112. The control unit 102 may be capable of communicating over more than one network; for example, the control unit 102 may be capable of communicating with a radio frequency identification (RFID) tag, a wireless Internet network, a cellular network, and others.

Generally, control unit 102 may operate under control of an operating system stored in memory 124 and interfaces with a user to accept inputs and commands and to present outputs through user interface 112. Control unit 102 may also implement a compiler (not shown) which allows one or more application programs (not shown) written in a programming language to be translated into processor-readable code. Instructions implementing an application program may be tangibly embodied in a computer-readable medium. Further, an application program may include instructions which, when read and executed by processor 122, cause processor 122 to perform the steps necessary to implement and/or use embodiments of the present disclosure. It is noted that an application program and/or operating instructions may also be tangibly embodied in memory 124 and/or data communications devices, thereby making a computer program product or article of manufacture according to an embodiment the present disclosure. As such, the term "application program" as used herein is intended to encompass a computer program accessible from any computer readable device or media. Furthermore, portions of the application program may be distributed such that some of the application program may be included on a computer readable media within control unit 102, and some of the application program may be included in a remote device, such as a remote computer.

The control unit 102 may thus be a component in a security system and/or a building automation system. The control unit 102 may provide security and/or automation functionality for a residence, an office, a building, or other appropriate space.

In many embodiments, the control unit 102 may be realized as a control panel. As used herein, the term "control panel" refers to a standalone, dedicated unit for providing security and/or building automation functionality. The term "control panel" does not include a general purpose computer, smart phone, tablet, or other general purpose device that may run an application providing some security/automation functionality.

The control unit 102 may further include a traffic module 200. The traffic module 200 may be software, firmware, hardware, or a combination thereof. The traffic module 200 may be configured to receive information about traffic conditions and to communicate information about traffic conditions to the user. The traffic module 200 may also suggest routes to the user, taking into account the traffic conditions.

Figure 3:
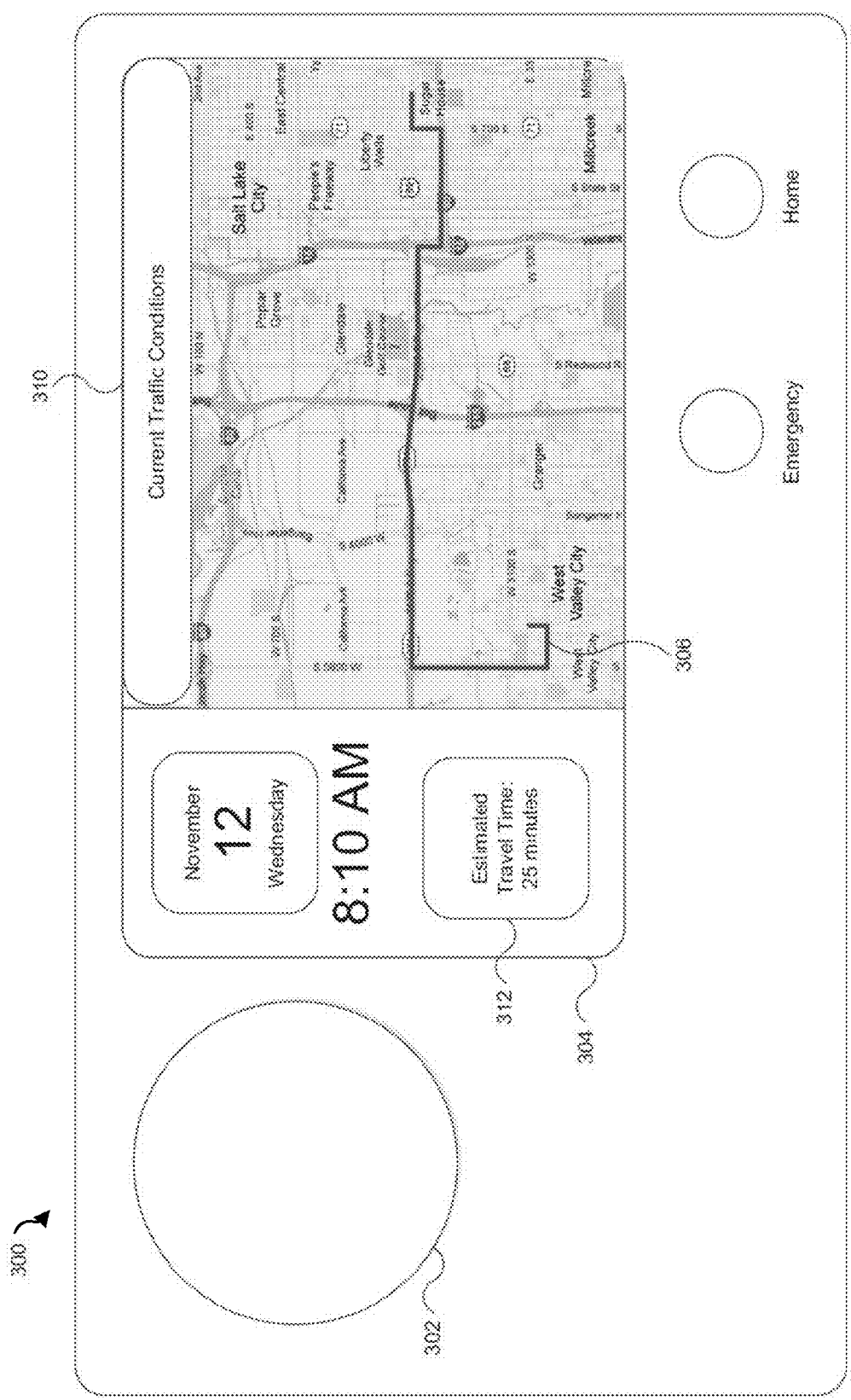
FIG. 3 is a schematic block diagram illustrating one embodiment of a control unit communicating traffic data to a user.

FIG. 3 illustrates one embodiment of a control unit 300 configured to provide information about traffic conditions. The control unit 300 may be configured to receive traffic data for a geographic area associated with the control unit 300 and to communicate the traffic data to a user through the control unit 300. The user may define the geographic area of interest or provide information (such as a location of the facility that includes the control unit 300 and one or more common destinations) that allows the control unit 300 to determine the geographic area. In other embodiments, the control unit 300 may be configured to determine a default geographic area for the control unit 300, such as a neighborhood, a city, a county, or other geographic area.

FIG. 3 illustrates the control unit 300 having a display 304. The display 304 provides visual information for the user, and may also be a touch-screen device capable of accepting inputs. The display 304 may show time and date information, and may be used to communicate traffic data to the user of the control unit 300. In one embodiment, the display 304 shows a menu with various options that a user can select to cause the control unit 300 to perform various actions associated with the control unit 300. One menu option may be to display the traffic data on the display 304 as seen in FIG. 3.

In one embodiment, the control unit 300 automatically communicates the traffic data to the user through the control unit 300 during certain predefined time periods. One predefined time period may correspond to the morning commute time period, and a second predefined time period may correspond to the evening commute time period. The user may define the predefined time periods manually, or provide information allowing the control unit 300 to determine appropriate time periods. For example, the user may indicate that she leaves for work at between 8:00 and 9:00 in the morning. The control unit 300 may be configured to automatically display the map and overlay traffic data, as illustrated in FIG. 3, from 7:30 to 9:30 in the morning. At other times of the day, the user may access the traffic data from one or more menus provided by the control unit 300 as described above.

Similarly, the control unit 300 may display the traffic at certain destinations at certain times of day. The control unit 300 may, for example, display the traffic conditions at an individual's place of employment at 5:30 so that those in the home with access to the control unit 300 (such as children) may estimate a time of return.

The control unit 300 may communicate the traffic data to the user through the control unit 300 by displaying a map that includes at least a portion of the geographic area for which the control unit 300 receives traffic data on the display 304 of the control unit 300. The control unit 300 may overlay a visual representation of the traffic data onto the map. The control unit 300 may use colors to indicate the traffic congestion along roadways shown on the map. The color green may be used to indicate regular flow of traffic, yellow to indicate slow flow of traffic, and red to indicate moderate to severe traffic congestion. The control unit 300 may also use icons to communicate traffic data; for example, the control unit 300 may use icons to indicate traffic accidents, construction, detours, or other traffic data that may be relevant to the user. In the embodiment shown in FIG. 3, the map and the overlayed traffic information are displayed in a traffic conditions window 310 of the display 304.

As seen in FIG. 3, the control unit 300 may be aware of one or more routes 306 between a starting point and a destination. In FIG. 3, the route 306 is marked as a heavy black line on the map shown on the traffic conditions window 310 of the display 304. The control unit 300 may be configured to display a traffic status window 312 that includes information about traveling the route 306. The traffic status window 312 may, for example, report the estimated travel time to complete the route 306. The traffic status window 312 may also display information about traffic conditions along the route such as accidents, construction, and other conditions affecting traffic such as weather.

In one embodiment, the user enters the route 306. In other embodiments, the control unit 300 receives information about the origin and destination and determines an appropriate route 306 between the two points. The user may have the option to override any route 306 suggested or provided by the control unit 300. The user may also provide certain parameters to the control unit 300 for determining the route 306; for example, the user may specify one or more streets to avoid in planning the route 306.

The control unit 300 may also be configured to provide audible notifications comprising traffic data. For example, the control unit 300 may provide an audible alert anytime it determines that one or more traffic conditions, derived from the traffic data, will shorten or lengthen the estimated travel time. The control unit 300 may also audibly alert the user to any traffic incidents (such as an accident or construction) along the route 306. The control unit 300 may provide the traffic data in substantially real time such that the control unit 300 dynamically accounts for changes in the traffic data.

In certain embodiments, the control unit 300 is configured to communicate a suggested route 306 from an origin to a destination based on the traffic data. The control unit 300 may, in one embodiment, communicate the suggested route 306 by displaying it on the control unit 300 as seen in FIG. 3. The control unit 300 may also communicate the suggested route 306 by sending it to a mobile electronic device. The control unit 300 may, for example, send the suggested route as vector information in a Geographic Information System (GIS) file format. The control unit 300 may be configured to monitor traffic along a plurality of possible routes 306 and to select the fastest route as the suggested route for the user. The control unit 300 may dynamically update and change the route 306 to account for changes in the traffic conditions along the route 306.

In certain embodiments, the control unit 300 may be configured to provide a "traffic" button on the user interface. The traffic button may be a soft button or a hard button. The control unit 300 may be configured to pull up traffic information and display the traffic information for the use as described herein. As a result, the user may have easy access to traffic information through the control unit 300.

The control unit 300 may be further configured to share information concerning changes in the estimated commute time. For example, if the estimated commute time increases beyond a certain threshold, the control unit 300 may alert the user to the change in the commute time. In one embodiment, the control unit 300 alerts the user to the change in the commute time if the commute time increased beyond 10% of the normal commute time. Other thresholds (15 minutes; 20%; etc.) may also be used. In one embodiment, the thresholds are user configurable.

Figure 4:
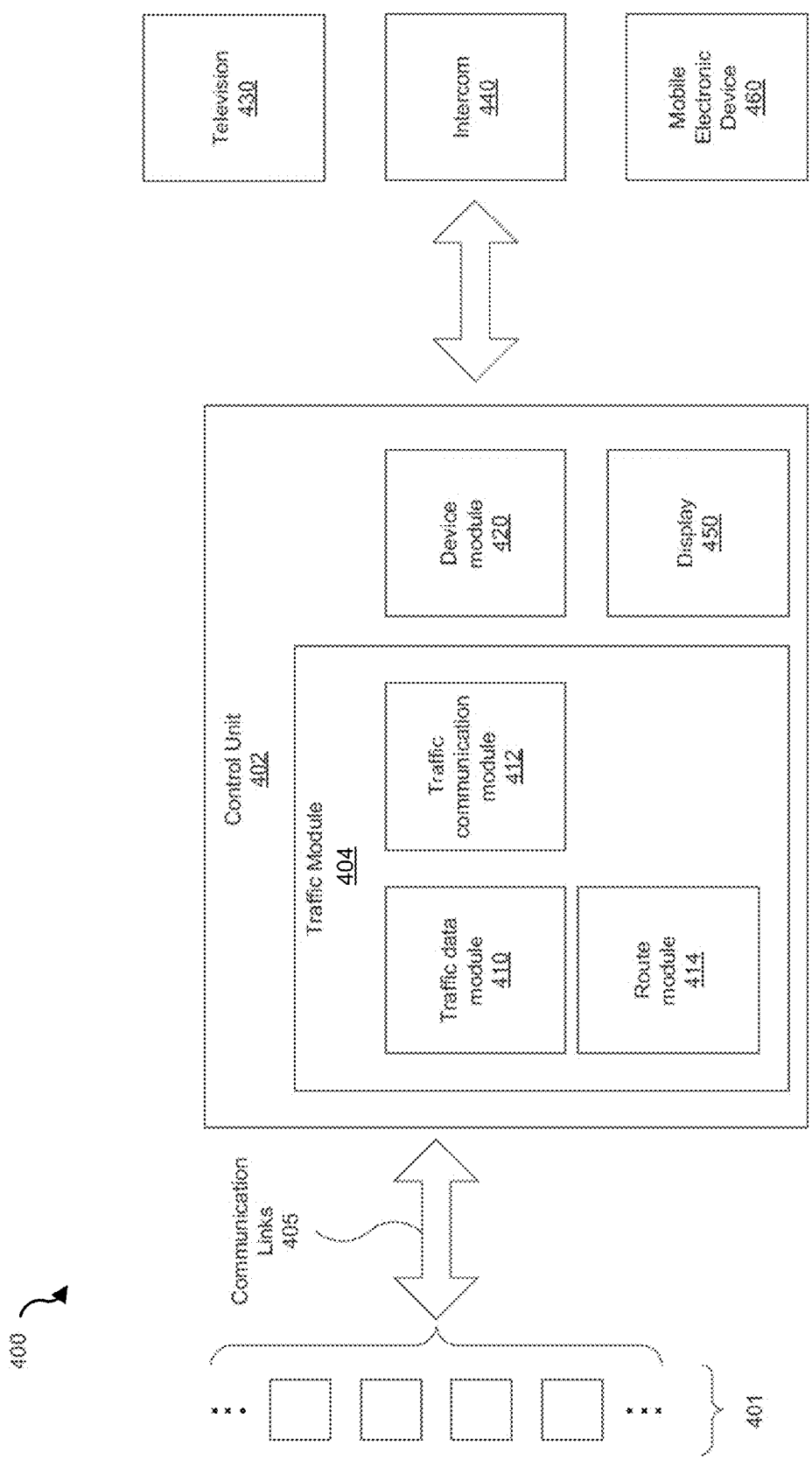
FIG. 4 is a schematic block diagram illustrating one embodiment of a security system for communicating traffic data to a user.

FIG. 4 illustrates one embodiment of an automation system 400 including sensors 401 that are communicatively connected to a control unit 402 by communication links 405. The control unit 402 is also illustrated as communicatively connected to a television 430 and an intercommunications system (intercom) 440. The control unit 402 may be connected to the television 430 and the intercom 440 by a wired connection, a wireless connection, or other suitable communications connection. The control unit 402 may also be coupled to other devices in addition to (or instead of) the television 430 and the intercom 440. The control unit 402 may, for example, be a component in a building automation system and thus be connected to various electronic devices within the facility where the control unit 402 is installed. The control unit 402 may communicate information with these electronic devices in order to provide building automation functions. In the embodiment shown in FIG. 4, the control unit 402 includes a device module 420 that allows the control unit 402 to communicate with the various devices having a communication connection with the control unit 402. The control unit 402 may be configured to communicate information to a user using one or more of these electronic devices, as described below.

The control unit 402 is illustrated as having a traffic module 404 that comprises a traffic data module 410, a traffic communication module 412, and a route module 414. The traffic data module 410 may be configured to receive traffic data for a geographic area associated with the control unit 402. The traffic data module 410 may receive the traffic data from a remote server as further described below.

The traffic communication module 412 may be configured to communicate the traffic data to a user. The traffic communication module 412 may use the display 450 of the control unit 402 as discussed in connection with FIG. 3. In another embodiment, the traffic communication module 412 may communicate the traffic data through the electronic devices that are communicatively coupled to the control unit 402. For example, the traffic communication module 412 may use the device module 420 to display information about traffic conditions on the television 430. The television 430 may be configured to display a notice that includes the estimated travel time of a route to the user's destination. The television 430 may display a map with traffic information in a small display window while showing a television program in the larger window.

The traffic communication module 412 may also communicate the traffic data through other electronic devices. The traffic communication module 412 may, for example, provide audible information about traffic conditions using the intercom 440. The traffic communication module 412 may communicate the traffic information through other suitable devices such as connected clocks, radios, mobile electronic devices, or other types of electronic device. The control unit 402 may provide an alarm to wake a user at a certain time; the control unit 402 may use the intercom 440 to provide an audible notice as part of the alarm to wake the user, and may provide information about traffic conditions as part of that alarm.

The traffic communication module 412 may communicate the traffic information to the user through multiple channels, such as the display 450 of the control unit 402 and one or more of the connected electronic devices, such as the television 430 and the intercom 440 shown in FIG. 4. Such an embodiment may allow the user to remain apprised of relevant traffic conditions even as the user moves throughout the home or other location associated with the control unit 402. In one embodiment, the user can turn on and turn off the notifications on the connected electronic devices from the control unit 402.

The route module 414 may be configured to determine and communicate a suggested route from an origin to a destination based on the traffic data. The route module 414 may receive one or more destinations from the user, determine one or more routes from the location of the control unit 402 to the destinations, and designate the fastest route (i.e., the route that takes the user from the origin to the destination in the shortest period of time) as the suggested route to provide to the user. The route module 414 may be configured to account for traffic using the traffic data in determining the fastest route.

In certain embodiments, the route module 414 sends the suggested route to a mobile electronic device 460. The mobile electronic device 460 may be a cellular phone, a tablet computer, a global position system (GPS) device installed in a vehicle, or other appropriate mobile electronic device 460. The user may register one or more mobile electronic devices 460 to communicate with the route module 414 of the control unit 402.

In one embodiment, the route module 414 sends the suggested route to the mobile electronic device 460 in response to the security system detecting a departure of the user associated with the suggested route. The route module 414 may use one or more criteria to determine whether the user has departed. In one embodiment, the route module 414 sends the suggested route in response to the user arming the security system during one or more predefined time periods. The route module 414 may send the suggested route in response to the garage door being opened and subsequently closed during a predefined time period. The route module 414 may send the suggested route in response to a mobile electronic device 460 associated with the user (such as a cellular phone) leaving a predefined geographic space within a predefined time period. Other events and combinations of events that may indicate the departure of the user may also be used to cause the route module 414 to send the suggested route to the mobile electronic device 460.

In one embodiment, the mobile electronic device 460 is configured to share information about the suggested route with the route module 414. The mobile electronic device 460 may, for example, determine the actual time that was required for the user to travel the suggested route provided by the route module 414. The route module 414 may receive the actual time and compare it to the estimated time. The route module 414 may associate the actual time with the traffic conditions that existed when the route module 414 determined the estimated time. In this manner, the route module 414 may be configured to learn from the actual time and provide more accurate estimated times in the future. The route module 414 may use an artificial neural network (ANN) or other approach that allows the route module 414 to learn from the actual time and improve the model used to generate the estimated time. The route module 414 and/or the mobile electronic device 460 may also share the actual time with a remote server.

Figure 5:
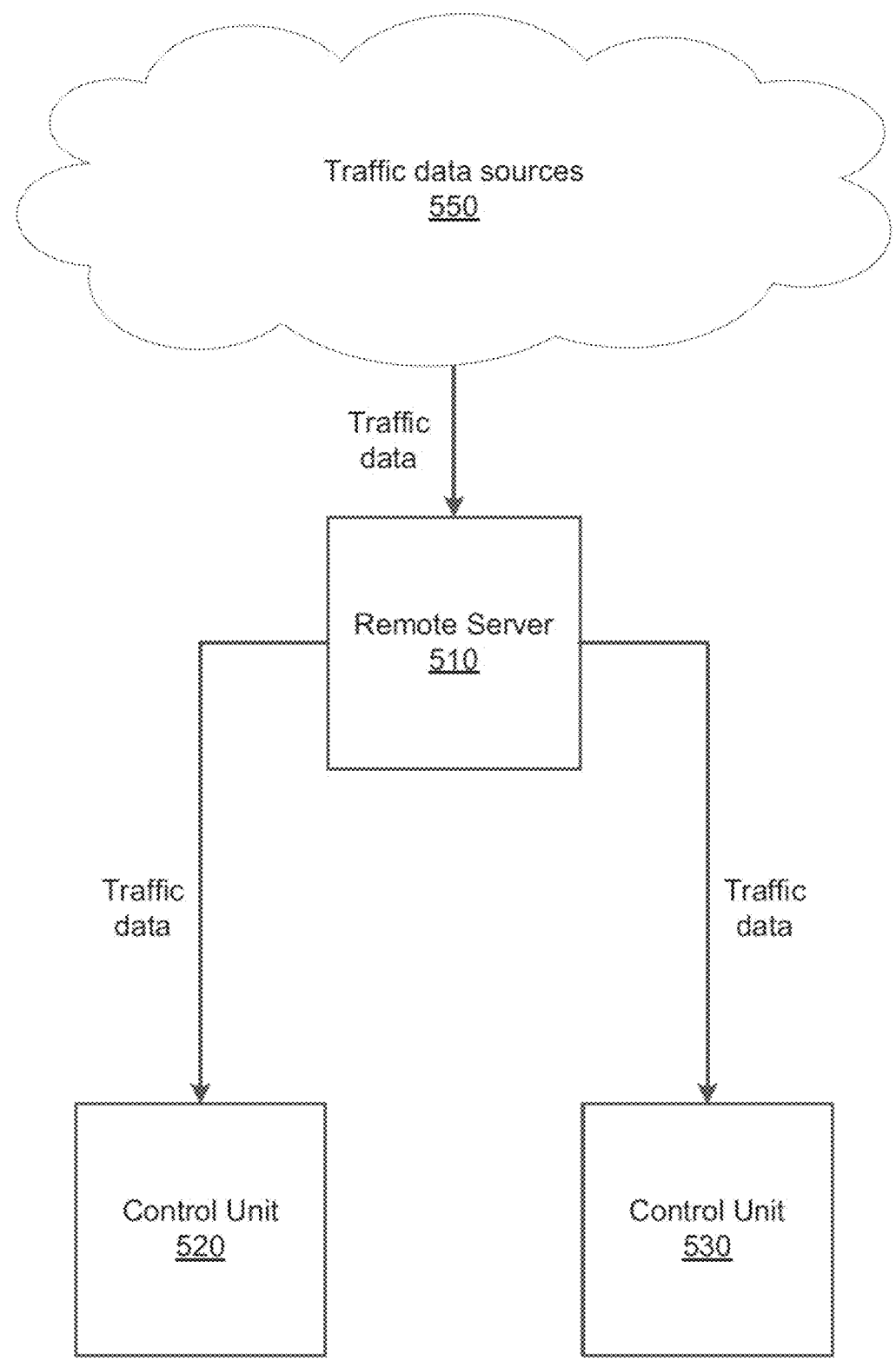
FIG. 5 is a schematic block diagram illustrating one embodiment of a security system for communicating traffic data to a user that includes a remote server and traffic data sources.

FIG. 5 shows one embodiment of a system 500 for providing traffic information to one or more users of a control unit. The system 500 includes traffic data sources 550, a remote server 510, and control units 520 and 530. While FIG. 5 illustrates only two control units, the remote server 510 may be configured to communicate with any number of control units. Similarly, while FIG. 5 illustrates only one remote server 510, any number of physical machines may be configured to provide the functionality of the remote server 510. In one embodiment, the remote server 510 is a virtual machine comprising a plurality of physical computing devices.

The remote server 510 may receive traffic data from one or more traffic data sources 550. The traffic data sources 550 may be one or more separate entities that provide traffic data. Some companies act as third-party traffic data aggregators and collect traffic data from various sources and make it available for third-party use. For example, Google Inc. collects traffic data from traffic sensors and also derives traffic data from the movement of mobile phones with software developed by Google Inc. installed on them. As the mobile phones move, they may communicate movement data to Google Inc., allowing the company to derive information about live traffic conditions. Other companies, such as TomTom NV and INRIX, Inc. may also collect traffic data and make that traffic data available. Similarly, state agencies, such as a state department of transportation, may collect traffic data from sensors and cameras and make that traffic data available to third-parties. The remote server 510 may use one or more traffic data sources 550 to collect traffic data that may be provided to one or more control units 520.

The remote server 510 may collect the traffic data and aggregate the traffic data. Such an embodiment may provide for a more accurate and complete picture of traffic conditions for a wide geographic area. The remote server 510 may save the traffic data in one or more databases that are accessible to the control units 520 and 530 that are in communication with the remote server 510. In one embodiment, the remote server 510 is associated with the monitoring system 103 discussed above. In such embodiments, the remote server 510 may provide additional features, such as sharing information between the monitoring system 103 and the control units 520 and 530, providing software updates for the control units 520 and 530, etc.

In certain embodiments, the remote server 510 may collect traffic data directly from mobile phones or other portable electronic devices. The remote server 510 may also collect traffic data from portable electronic devices associated with the control units 520 and 530 that are in communication with the remote server 510. For example, the mobile phones of users of security systems associated with the remote server 510 may have applications installed on them that allow users to interact with the security systems remotely. The applications may be further configured to collect data about the movement of the mobile phones, which the remote server 510 may convert to traffic data.

The first control unit 520 may be located in a first city, while the second control unit 530 may be located in a second city. The first control unit 520 may be configured to receive traffic data for only the first city, while the second control unit 520 receives traffic data for the second city. The remote server 510 may be aware of the geographic areas associated with each of the control units 520 and 530, and push traffic data updates for the geographic areas to the control units 520 and 530. In other embodiments, the control units 520 and 530 may pull traffic data from the remote server 510. The control units 520 and 530 may allow the users to dynamically adjust the geographic area by, for example, zooming in and zooming out on the map, entering the name of another city as input, or other ways of adjusting the geographic area.

In certain embodiments, the control units 520 and 530 receive the traffic data directly from the traffic data sources 550. For example, in one embodiment, the traffic module 200 discussed in connection with FIG. 2 is an application executing on the control unit 520 that is configured to use the Google® Maps Application Programming Interface (API) in order to receive traffic data for a geographic area and to communicate the traffic data to the user through the control unit 520 by displaying a map with a traffic layer.

In one embodiment, the control unit 520 comprises web-browser software, and the traffic module 200 comprises the following code executable by the web-browser:

```
<html>
<head>
<title>Google Traffic Layer Map Display for Control Unit in Salt Lake City</title>
<scripttype="text/javascript"
src="http://maps.google.com/maps/api/js?sensor=false"></script> <script type= "text/javascript">
function initialize( )
{
var map = new google.maps.Map(document.getElementById("map"),
```

```
{
zoom: 12,
center: new google.maps.LatLng(40.74, −111.887), mapTypeId: google.maps.MapTypeId.ROADMAP
});
var trafficLayer = new google.maps.TrafficLayer( );
trafficLayer.setMap(map);
}
</script>
</head>
<body onload="initialize( )">
<div id="map" style="width: 600px; height: 320px"></div>
</body>
</html>
```

The above code example, when executed by a browser, causes the display of the control unit 520 to display a map with a corresponding traffic layer indicating traffic conditions.

Figure 6:
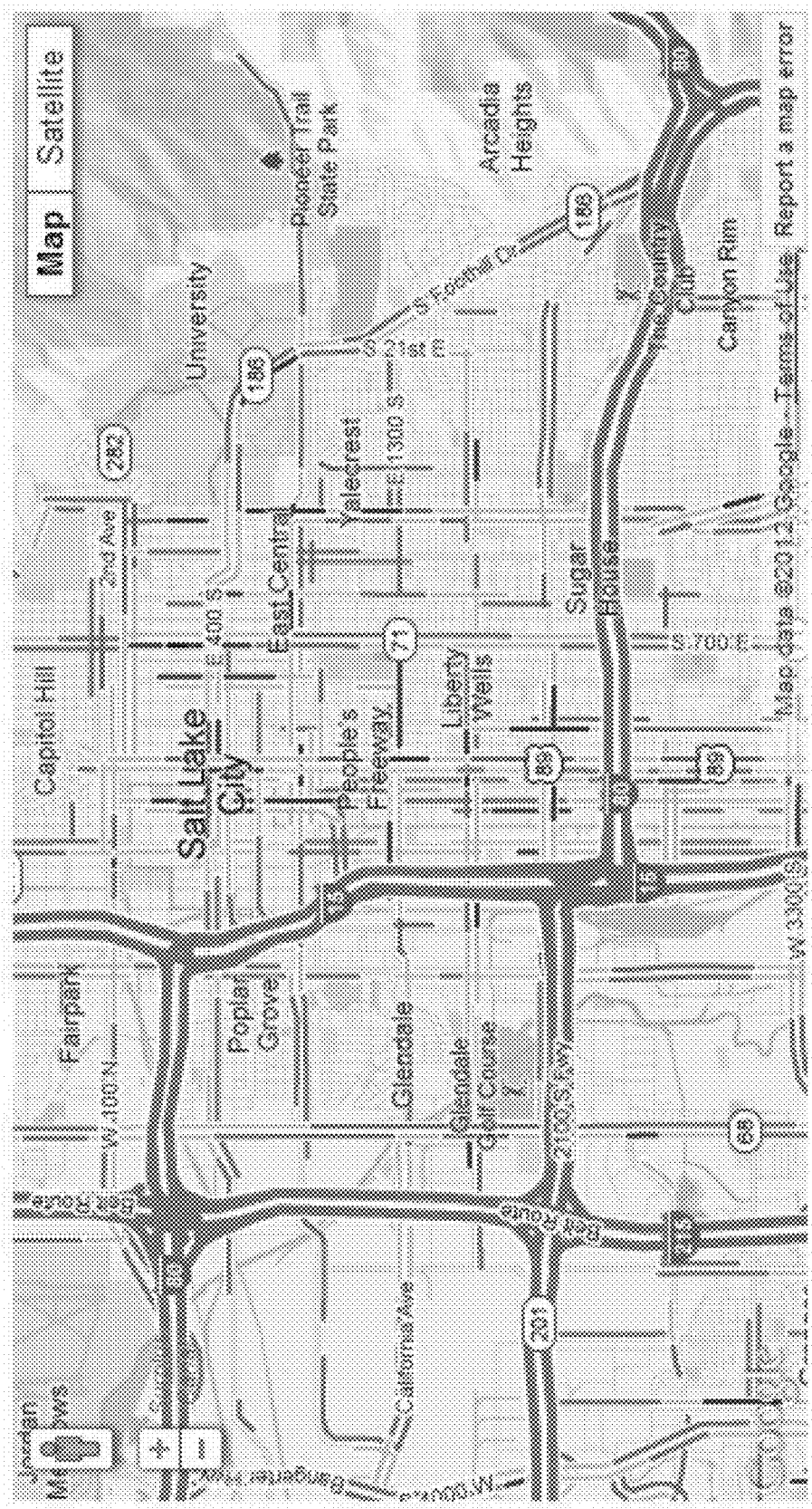
FIG. 6 is an illustration of the output of a provided code sample for providing traffic data to a user.

FIG. 6 illustrates the output of the above code example in the browser window when executed by a browser. Other approaches to receiving traffic data and communicating traffic data other than the example given above may also be used. Similarly, the actual code for the traffic module 200 may be more complicated and include additional features described herein but not included in the code example given above.

While the above code example for the control unit 520 is for Salt Lake City, the control unit 530 may be for a different city or for a different area of Salt Lake City. The users of the control units 520 and 530 may define the geographic area for which they desire traffic data. Each control unit 520 and 530 may also be configured to determine a default geographic area based on information provided by the user and/or information provided by the monitoring system 103.

Figure 7:
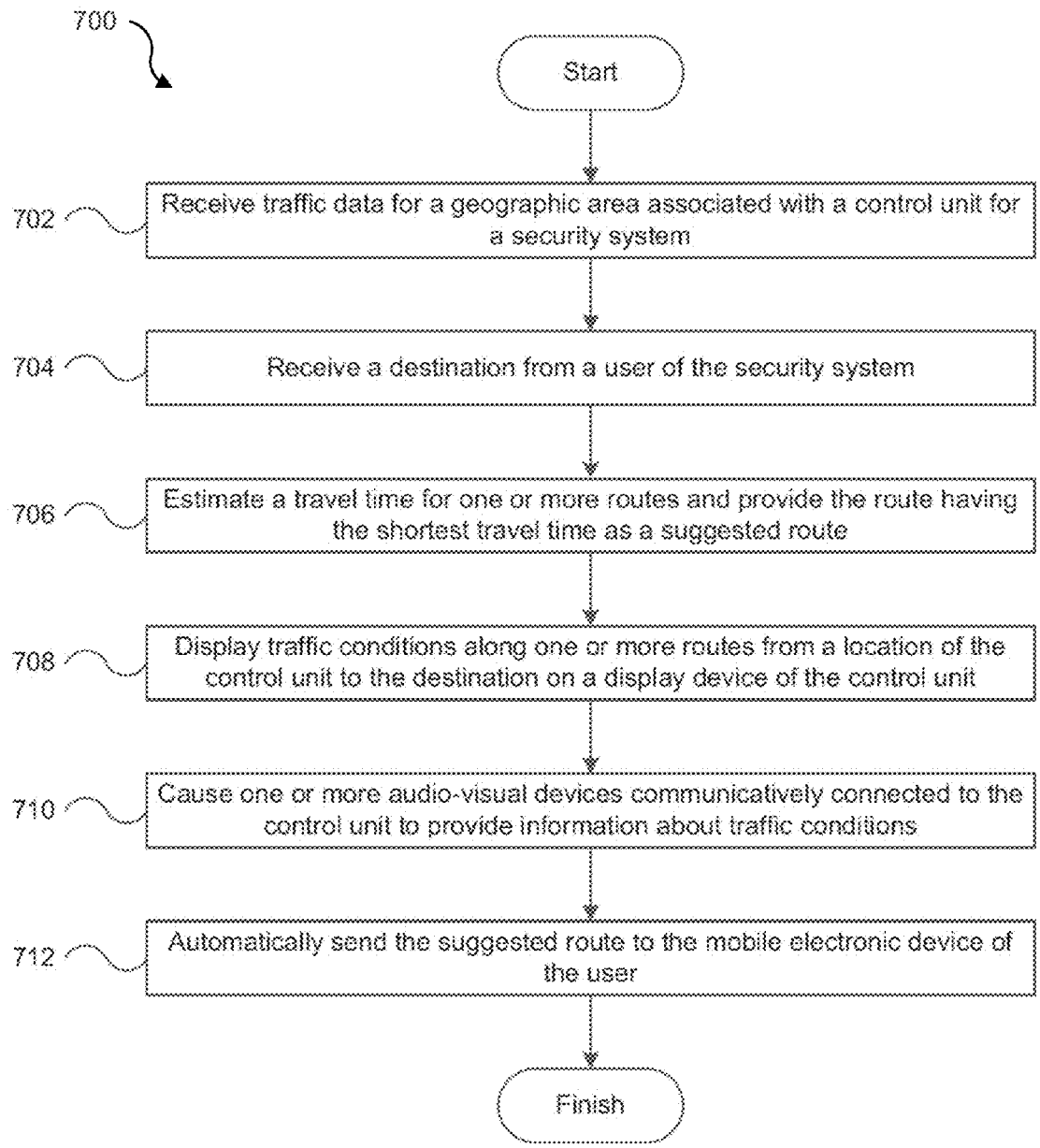
FIG. 7 is a flow diagram illustrating one embodiment of a method for communicating traffic data to a user.

FIG. 7 illustrates one embodiment of a method 700 for providing a user of a control panel with information about traffic conditions. In FIG. 7, the method 700 begins at block 702 with receiving traffic data for a geographic area associated with a control unit for a security system. The control unit may be the device receiving the traffic data, and it may receive the traffic data from a remote server that aggregates traffic data, a third-party traffic data aggregator, or other source of traffic data.

The method 700 may further involve, at block 704, receiving a destination from a user of the security system. The user may, for example, enter a destination using the control panel, an Internet-connected computing device, or other appropriate device. The user may also provide more than one destination. The control panel may store multiple destinations for multiple users.

The method 700 may also involve, at block 706, estimating a travel time for one or more routes and providing the route having the shortest travel time as a suggested route for the user. The traffic data may be taken into account in estimating the travel time for each of the possible routes. In certain embodiments, the method also involves receiving the actual travel time to the destination and adjusting the model used to estimate the travel times to account for the actual travel times. Such an embodiment may allow the control panel, or the other device providing the estimates, to refine the model and provide improved accuracy.

The method 700 may include, at block 708, displaying traffic conditions along one or more routes from a location of the control unit to the destination on a display of the control unit. In one embodiment, the control unit displays a map on the control unit's display and overlays the traffic conditions such that the user can easily see the state of the traffic in real time. In such an embodiment, colors and icons may be used to communicate the traffic conditions to the user. The control unit may, in one embodiment, limit the display of traffic conditions to the suggested route.

The method 700 may also include, at block 710, causing one or more audio-visual devices communicatively connected to the control unit to provide information about the traffic conditions. The control unit, for example, may be part of a building automation system, and may cause the television to display information about traffic conditions during the time period associated with the morning commute. The control unit may be communicatively connected to a mobile phone of the user, and may display information about traffic conditions on the display of the mobile phone. Other audio-visual devices other than or in addition to the television may be used to provide information about traffic conditions.

The method 700 may also involve, at block 712, automatically sending the suggested route to a mobile electronic device of the user. For example, the control panel may send the suggested route to the mobile phone of the user when it determines that the user is leaving the facility associated with the control unit. The control panel may send the suggested route to the GPS unit of the user's car at the time of departure.

Figure 8:
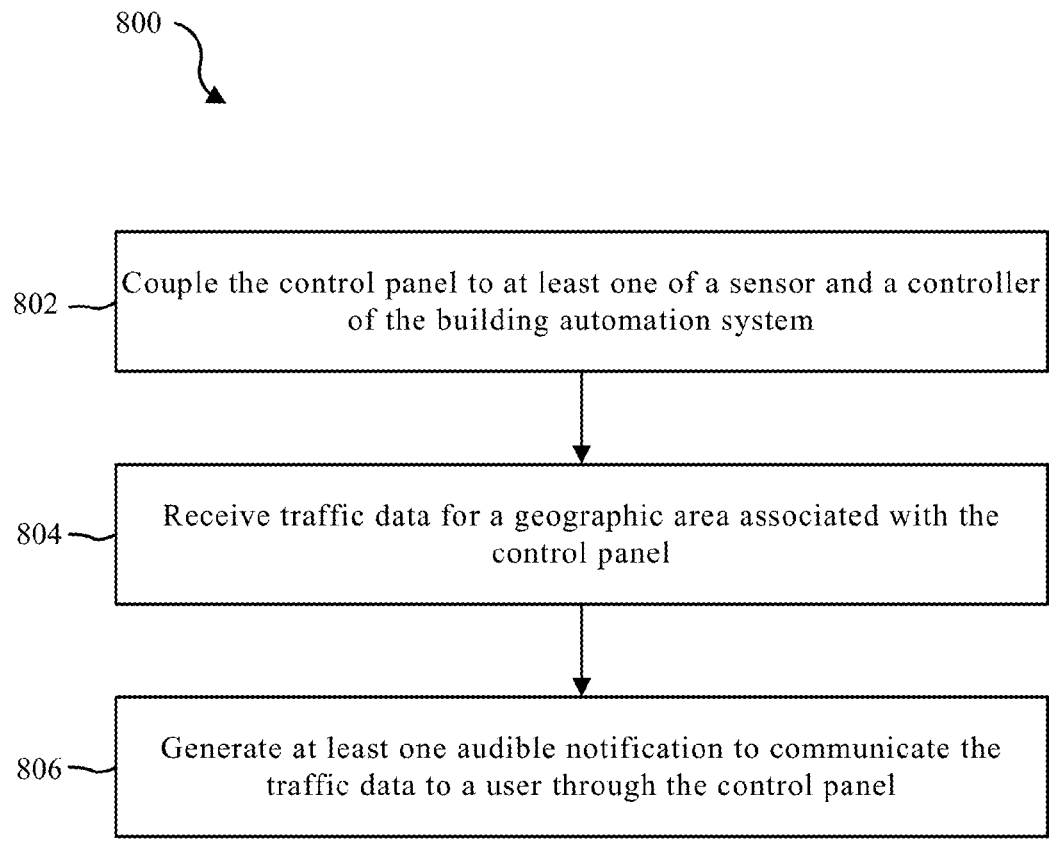
FIG. 8 is a flow diagram illustrating another embodiment of a method for communicating traffic data to a user.

FIG. 8 illustrates one embodiment of a method 800 for providing a user of a control panel with information about traffic conditions. In FIG. 8, the method 800 begins at block 802 with a step of coupling the control panel to at least one of a sensor and a controller of the building automation system. Block 804 includes receiving traffic data for a geographic area associated with the control panel. Block 806 of method 800 includes generating at least one audible notification to communicate the traffic data to a user through the control panel.

Method 800 may also include displaying a map comprising at least a portion of the geographic area on a display of the control panel, and overlaying a visual representation of the traffic data onto the map. The at least one audible notification may include at least one of directions to a specified destination and estimated travel time to a specified destination. The at least one audible notification may relate to traffic conditions on one or more predetermined routes. Method 800 may include automatically communicate the traffic data to the user through the control panel during at least one predefined time period. A first predefined time period may correspond to a morning commute time period and a second predefined time period corresponds to an evening commute time period. Method 800 may include communicating the traffic data to the user through at least one device communicatively coupled to the control panel. The at least one device may include at least one of a television, a clock, a radio, and a mobile electronic device. Method 800 may include communicating a suggested route to a destination based on the traffic data. Communicating the suggested route may include sending the suggested route to a mobile electronic device in response to the automation system detecting a departure of the user associated with the suggested route. The traffic data may include traffic incidents, and method 800 includes communicating the traffic incidents to the user. The traffic data may be received from a remote server. The geographic area may be one of a neighborhood, a city, a county, and a user-defined geographic area.

Figure 9:
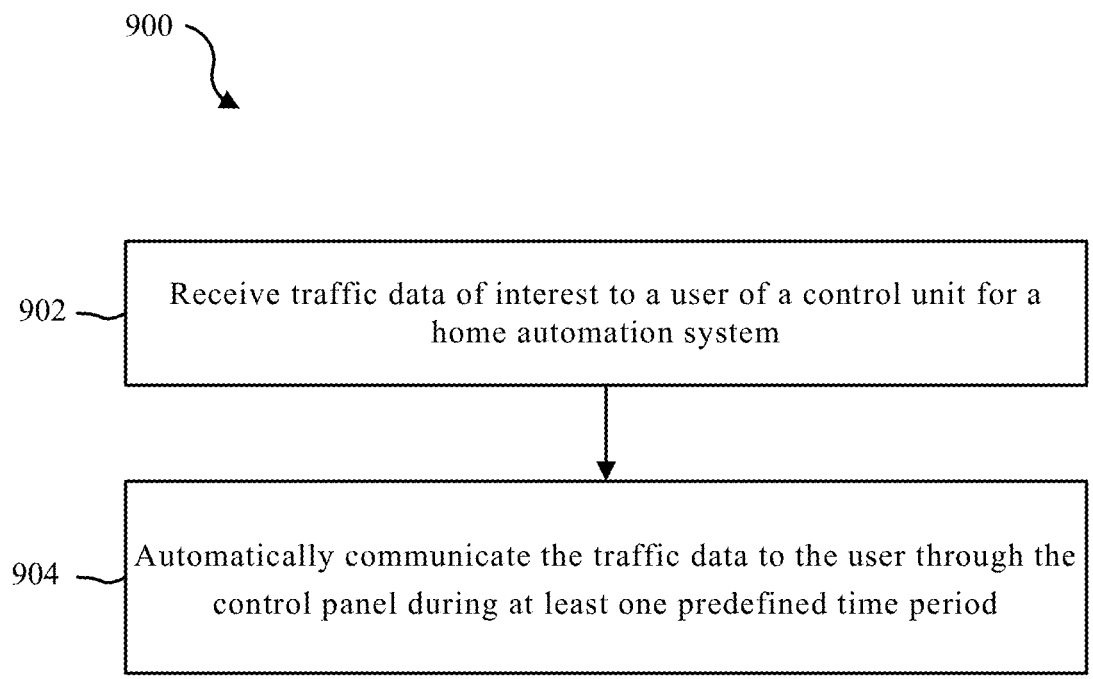
FIG. 9 is a flow diagram illustrating another embodiment of a method for communicating traffic data to a user.

FIG. 9 illustrates one embodiment of a method 900 for providing a user of a control panel with information about traffic conditions. In FIG. 9, the method 900 begins at block 902, which includes receiving traffic data of interest to a user of a control unit for a home automation system. Block 904 includes automatically communicate the traffic data to the user through the control panel during at least one predefined time period.

The first predefined time period of method 900 may correspond to a morning commute time period and a second predefined time period corresponds to an evening commute time period. Method 900 may include displaying a map of a geographic area on a display unit of the control unit, and overlaying a graphical representation of at least a portion of the traffic data over the map of the geographic area displayed on the display unit. Method 900 may include determining at least one suggested route to a destination, and estimating an amount of time for traveling the at least one suggested route. Method 900 may also include receiving an actual time for traveling a suggested route to a destination from a mobile electronic device of a user traveling the suggested route, and associating the actual time with the traffic data for determining future suggested routes.

Figure 10:
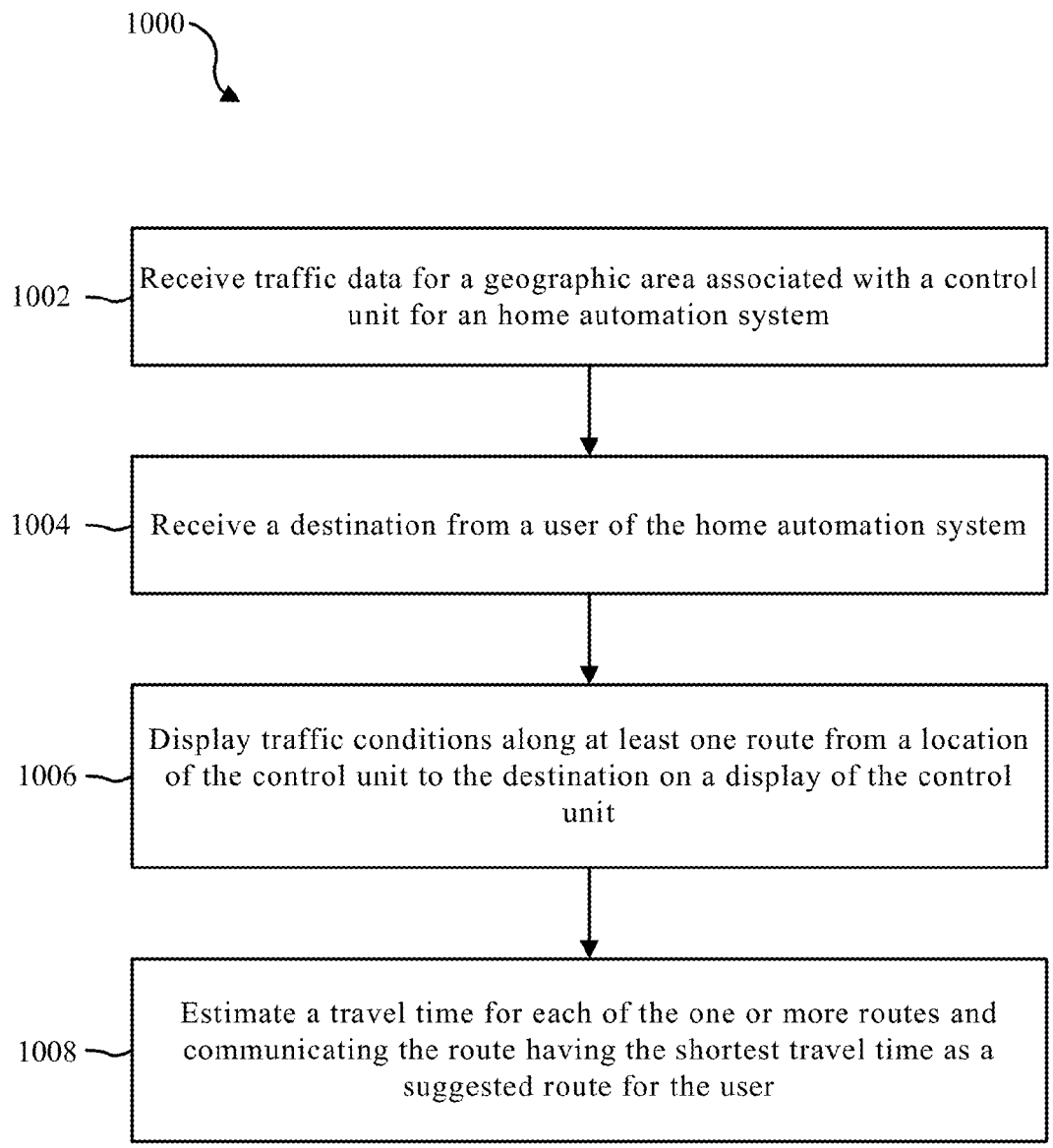
FIG. 10 is a flow diagram illustrating another embodiment of a method for communicating traffic data to a user.

FIG. 10 illustrates one embodiment of a method 1000 for providing a user of a control panel with information about traffic conditions. In FIG. 10, the method 1000 begins at block 1002, which includes receiving traffic data for a geographic area associated with a control unit for a home automation system. Block 1004 includes receiving a destination from a user of the home automation system. Block 1006 of method 1000 includes displaying traffic conditions along at least one route from a location of the control unit to the destination on a display of the control unit. Block 1008 includes estimating a travel time for each of the one or more routes and communicating the route having the shortest travel time as a suggested route for the user. Method 1000 may also include automatically sending the suggested route to a mobile electronic device of the user.

Figure 11:
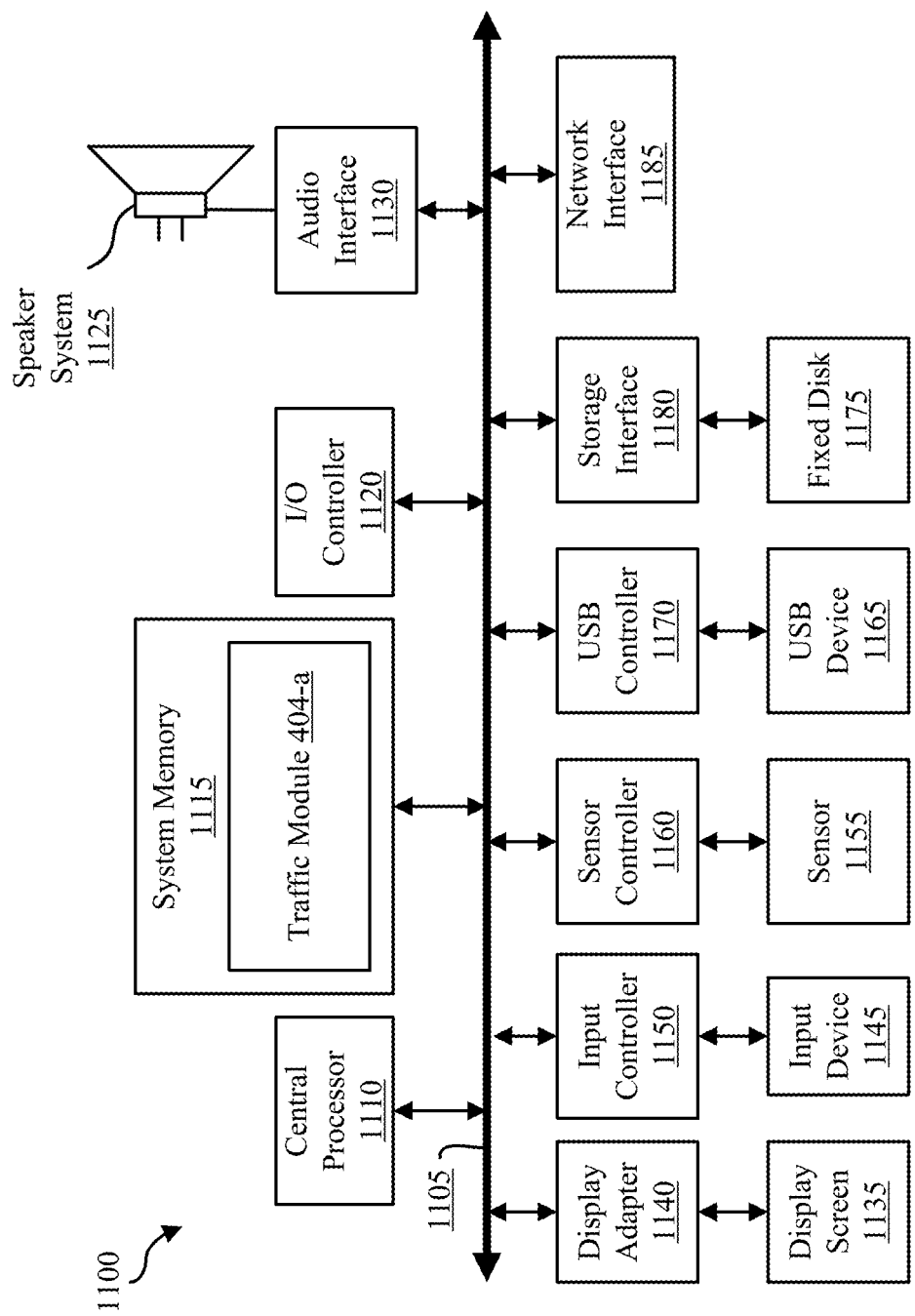
FIG. 11 is a block diagram of a computer system suitable for implementing the present systems and methods of FIGS. 1-10.

FIG. 11 depicts a block diagram of a controller 1100 suitable for implementing the present systems and methods. In one configuration, controller 1100 includes a bus 1105 which interconnects major subsystems of controller 1100, such as a central processor 1110, a system memory 1115 (typically RAM, but which may also include ROM, flash RAM, or the like), an input/output controller 1120, an external audio device, such as a speaker system 1125 via an audio output interface 1130, an external device, such as a display screen 1135 via display adapter 1140, an input device 1145 (e.g., remote control device interfaced with an input controller 1150), multiple USB devices 1165 (interfaced with a USB controller 1170), and a storage interface 1180. Also included are at least one sensor 1155 connected to bus 1105 through a sensor controller 1160 and a network interface 1185 (coupled directly to bus 1105).

Bus 1105 allows data communication between central processor 1110 and system memory 1115, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a traffic module 404-*a* to implement the present systems and methods may be stored within the system memory 1115. The traffic module 404-*a* may be an example of the traffic module 404 illustrated in FIG. 4. Applications resident with controller 1100 are generally stored on and accessed via a non-transitory computer readable medium, such as a hard disk drive (e.g., fixed disk 1175) or other storage medium. Additionally, applications can be in the form of electronic signals modulated in accordance with the application and data communication technology when accessed via interface 1185.

Storage interface 1180, as with the other storage interfaces of controller 1100, can connect to a standard computer readable medium for storage and/or retrieval of information, such as a fixed disk drive 1175. Fixed disk drive 1175 may be a part of controller 1100 or may be separate and accessed through other interface systems. Network interface 1185 may provide a direct connection to a remote server via a direct network link to the Internet via a POP (point of presence). Network interface 1185 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1100 wirelessly via network interface 1185.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 11 need not be present to practice the present systems and methods. The devices and subsystems can be interconnected in different ways from that shown in FIG. 11. The aspect of some operations of a system such as that shown in FIG. 11 are readily known in the art and are not discussed in detail in this application. Code to implement the present disclosure can be stored in a non-transitory computer-readable medium such as one or more of system memory 1115 or fixed disk 1175. The operating system provided on controller 1100 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the foregoing description contains many specifics, these should not be construed as limiting the scope of the invention or of any of the appended claims, but merely as providing information pertinent to some specific embodiments that may fall within the scopes of the invention and the appended claims. Features from different embodiments may be employed in combination. In addition, other embodiments of the invention may also be devised which lie within the scopes of the invention and the appended claims. The scope of the invention is, therefore, indicated and limited only by the appended claims and their legal equivalents. All additions, deletions and modifications to the invention, as disclosed herein, that fall within the meaning and scopes of the claims are to be embraced by the claims.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A control panel for a home automation and security system, the control panel comprising:
 a processor;
 a memory in electronic communication with the processor; and instructions stored in the memory, the instructions being executable by the processor to:
receive vehicular traffic data for a geographic area associated with the control panel, wherein the control panel comprises a dedicated unit located at a home and configured to communicate with one or more automation and security sensors located throughout the home;
analyze the vehicular traffic data in relation to a predetermined route to a destination;
identify a traffic condition that affects an aspect of the predetermined route;
identify an alternative route to the predetermined destination based at least in part on the identified traffic condition;
communicate, using a speaker in the home associated with the control panel, an audible alert and text-to-speech information regarding the alternative route;
communicate an audiovisual notification on a television associated with the control panel, wherein the audiovisual notification comprises audible and visual information regarding the alternative route; and
send the alternative route to a mobile electronic device in response to detecting a departure of an occupant of the home associated with the predetermined route.

2. The control panel of claim 1, wherein the instructions are executable by the processor to:
display a map comprising at least a portion of the geographic area on a display of the control panel; and
overlay a visual representation of the vehicular traffic data onto the map.

3. The control panel of claim 1, wherein the audibly communicated vehicular traffic data includes at least one of directions to a specified destination and estimated travel time to a specified destination.

4. The control panel of claim 1, wherein the audibly communicated vehicular traffic data comprises traffic conditions on one or more predetermined routes.

5. The control panel of claim 1, wherein the instructions are executable by the processor to:
automatically communicate at least some of the vehicular traffic data to the user through the user interface of the control panel during at least one predefined time period.

6. The control panel of claim 5, wherein a first predefined time period corresponds to a morning commute time period and a second predefined time period corresponds to an evening commute time period.

7. The control panel of claim 1, wherein the instructions are executable by the processor to:
communicate at least some of the vehicular traffic data to the user through at least one device communicatively coupled to the control panel.

8. The control panel of claim 7, wherein the at least one device comprises at least one of a television, a clock, a radio, and a mobile electronic device.

9. The control panel of claim 1, wherein the vehicular traffic data is received from a remote server.

10. The control panel of claim 1, wherein the geographic area is one of a neighborhood, a city, a county, and a user-defined geographic area.

11. A method for monitoring traffic, the method comprising:
receiving, by a processor of a control panel, vehicular traffic data for a geographic area associated with the control panel, wherein the control panel comprises a dedicated unit located at a home and configured to communicate with one or more automation and security sensors located throughout the home; and
analyzing, by the processor, the vehicular traffic data in relation to a predetermined route to a destination;
identifying, by the processor, a traffic condition that affects an aspect of the predetermined route;
identifying, by the processor, an alternative route to the predetermined destination based at least in part on the identified traffic condition;
communicating, by the processor using a speaker in the home associated with the control panel, an audible alert and text-to-speech information regarding the alternative route;
communicating, by the processor, an audiovisual notification on a television associated with the control panel, wherein the audiovisual notification comprises audible and visual information regarding the alternative route; and
sending, by the processor, the alternative route to a mobile electronic device in response to detecting a departure of an occupant of the home associated with the predetermined route.

12. The method of claim 11, further comprising:
displaying a map comprising at least a portion of the geographic area on a display of the control panel; and
overlaying a visual representation of the vehicular traffic data onto the map.

13. The method of claim 11, wherein the audibly communicated vehicular traffic data includes at least one of directions to a specified destination and estimated travel time to a specified destination.

14. The method of claim 11, wherein the audibly communicated vehicular traffic data comprises traffic conditions on one or more predetermined routes.

15. The method of claim 11, further comprising:
automatically communicating the vehicular traffic data to the user through the control panel during at least one predefined time period.

16. A non-transitory computer-readable storage medium storing computer executable instructions that when executed by a processor of a control panel cause the processor to:
receive vehicular traffic data for a geographic area associated with the control panel, wherein the control panel comprises a dedicated unit located at a home and configured to communicate with one or more automation and security sensors located throughout the home;
analyze the vehicular traffic data in relation to a predetermined route to a destination;
identify a traffic condition that affects an aspect of the predetermined route;
identify an alternative route to the predetermined destination based at least in part on the identified traffic condition;
communicate, using a speaker in the home associated with the control panel, an audible alert and text-to-speech information regarding the alternative route;
communicate an audiovisual notification on a television associated with the control panel, wherein the audiovisual notification comprises audible and visual information regarding the alternative route; and
send the alternative route to a mobile electronic device in response to detecting a departure of an occupant of the home associated with the predetermined route.

17. The computer-readable storage medium of claim 16, wherein instructions are further executable by the processor to:
display a map comprising at least a portion of the geographic area on a display of the control panel; and
overlay a visual representation of the vehicular traffic data onto the map.

* * * * *